(12) United States Patent
Disantis

(10) Patent No.: US 9,759,288 B2
(45) Date of Patent: Sep. 12, 2017

(54) CRIMP SLEEVE

(71) Applicant: Raymond Disantis, Willoughby Hills, OH (US)

(72) Inventor: Raymond Disantis, Willoughby Hills, OH (US)

(73) Assignee: The National Telephone Supply Company, Cleveland, OH (US)

( * ) Notice: Subject to any disclaimer, the term of this patent is extended or adjusted under 35 U.S.C. 154(b) by 819 days.

(21) Appl. No.: 14/244,200

(22) Filed: Apr. 3, 2014

(65) Prior Publication Data

US 2014/0302727 A1      Oct. 9, 2014

Related U.S. Application Data

(60) Provisional application No. 61/808,294, filed on Apr. 4, 2013.

(51) Int. Cl.
*F16G 11/02*          (2006.01)

(52) U.S. Cl.
CPC .................................. *F16G 11/02* (2013.01)

(58) Field of Classification Search
CPC ....................................................... F16G 11/02
See application file for complete search history.

(56) References Cited

U.S. PATENT DOCUMENTS 5,317,664 A * 5/1994 Grabiec ............... G02B 6/3887
385/81

\* cited by examiner

*Primary Examiner* — Michael C Miggins
(74) *Attorney, Agent, or Firm* — Fay Sharpe LLP; James E. Scarbrough

(57) ABSTRACT

A crimp sleeve for use with small enclosures has a body having an outer diameter and an opening having an inner diameter extending through the body. The sleeve joins a wire formed of stainless steel to a fiber formed of Vectran braid through the opening. The sleeve is formed of a material which has a high coefficient of friction relative to the wire, such as titanium.

17 Claims, 4 Drawing Sheets

| TEST # | LOAD IN lbs (AT FAILURE) | GAGE OUT (CG) | L AFTER CRIMP PRESSED (LESS THAN 0.300) | DIE AREA D | % REDUCTION | COMMENTS |
|---|---|---|---|---|---|---|
| 1 | 16.35 | 0.0872 | 0.296 | 0.006289351 | 147.2253% | WIRE BREAK @ SLEEVE |
| 2 | 16.35 | 0.0879 | 0.295 | 0.006354832 | 145.7082% | |
| 3 | 16.10 | 0.0860 | 0.293 | 0.006177179 | 149.8987% | WIRE BREAK @ SLEEVE |
| 4 | 16.10 | 0.0865 | 0.291 | 0.006223904 | 148.7734% | |
| b1 | 16.64 | 0.0871 | 0.294 | 0.006279999 | 147.4445% | WIRE BREAK @ SLEEVE |
| b2 | 17.05 | 0.0873 | 0.289 | 0.006298703 | 147.0067% | |
| b3 | 15.40 | 0.0865 | 0.297 | 0.006223904 | 148.7734% | |
| b4 | 17.10 | 0.0872 | 0.291 | 0.006289351 | 147.2253% | |
| b5 | 16.26 | 0.0869 | 0.295 | 0.006261298 | 147.8849% | |
| b6 | 17.08 | 0.0874 | 0.292 | 0.006308057 | 146.7887% | WIRE BREAK @ SLEEVE |
| r1 | 16.64 | 0.0865 | 0.296 | 0.006223904 | 148.7734% | |
| r2 | 17.05 | 0.0870 | 0.294 | 0.006270648 | 147.6644% | WIRE BREAK @ SLEEVE |
| r3 | 15.40 | 0.0869 | 0.293 | 0.006261298 | 147.8849% | WIRE BREAK @ SLEEVE |
| r4 | 17.10 | 0.0872 | 0.291 | 0.006289351 | 147.2253% | WIRE BREAK @ SLEEVE |
| r5 | 16.26 | 0.0874 | 0.293 | 0.006308057 | 146.7887% | WIRE BREAK @ SLEEVE |
| r6 | 17.08 | 0.0871 | 0.291 | 0.006279999 | 147.4445% | |
| 1 | 15.89 | 0.0872 | 0.293 | 0.006289351 | 147.2253% | WIRE BREAK @ SLEEVE |

FIG. 5

CRIMP SLEEVE

CLAIM OF PRIORITY

This application claims priority from Provisional Patent Application Ser. No. 61/808,294 filed on Apr. 4, 2013 which is incorporated herein by reference in its entirety.

BACKGROUND OF THE DISCLOSURE

This disclosure relates to crimping sleeves. More particularly, it relates to a crimping sleeve for use in small enclosures such as used in a medical or commercial application. Referring to FIG. 1, an existing enclosure or tube has a small envelope E within it in which the crimp sleeve at joint J must be used to join wire W to fiber F. The small envelope must accommodate both the crimp sleeve length (about 0.300 inches crimped) and the crimp sleeve travel (about 0.560 inches) based on pull wire travel along a longitudinal direction.

There is a need for a crimping sleeve which can join PTFE (Polytetrafluoroethylene) coated stainless steel wire to a fiber formed of Vectran braid. Vectran is a very fine weave of Liquid Crystal Polymer. The crimped sleeve must be configured to fit within a relatively small area within the enclosure and must be about to hold about 94% of the tensile strength of the wire.

Given the low coefficient of friction of PTFE coatings relative to commonly used ductile crimp materials such as copper and aluminum, there is a need for a crimp sleeve material which has a high coefficient of friction to PTFE and still remains ductile. Ductility is a critical feature of the sleeve material. There is also a need to provide crimp sleeve material which has a high coefficient of friction since the gripping surface area of the sleeve is limited by usable space in the enclosure. It is also important to use a high coefficient of friction material because methods of squeezing a highly ductile material such as copper to a greater degree only extrudes material outside the usable space of the enclosure. Titanium is such a material which has a high coefficient of friction and is less ductile than copper but more ductile than aluminum.

A disadvantage of squeezing less ductile materials such as aluminum to impart more normal force in the crimp is that the plastic braid or the wire can be damaged or brutalized thereby compromising the strength of the crimp assembly. Thus, there is need to control the compression to impart the necessary force to hold the wire and the braid in the crimp, keep the crimp within the space allowed by the device, and yet not brutalize or damage the braid or the wire with the crimp. This is accomplished by tightly controlling compression with die press tooling and tight tolerancing on the sleeve.

Still other benefits and aspects of the disclosure will become apparent upon a reading and understanding of the following detailed description.

SUMMARY OF THE DISCLOSURE

The present disclosure relates to crimping sleeves. More particularly, it relates to a crimping sleeve used in small enclosures or tubes.

In accordance with one aspect of the disclosure, a crimp sleeve for use with a small enclosure has a body having an outer diameter and an opening having an inner diameter extending through the body; the sleeve joins a wire to a fiber through the opening, wherein the sleeve is formed of a material which has a high coefficient of friction relative to the wire.

In accordance with another aspect of the disclosure, a crimp sleeve for use with an associated enclosure has a cylindrical body having an opening extending therethrough; the body is formed of titanium; wherein the opening accommodates wire and fiber to be joined together, and wherein the body is crimped by an associate die to form flash material on opposite sides of the body.

In accordance with another aspect of the disclosure, the crimping sleeve in accordance with a preferred embodiment of the disclosure is configured to join wire such as 0.008 inch diameter, PTFE coated, stainless steel wire to a fiber such as 8×200 denier Vectran braid. Vectran is a material which is a very fine weave of Liquid Crystal Polymer. The crimped sleeve is also configured to fit within a relatively small area or enclosure E such as within a tube or medical device such as but not limited to a catheter device and is designed to hold about 94% of the tensile strength of the wire.

Given the low coefficient of friction of PTFE coatings relative to commonly used ductile crimp materials such as copper and aluminum, another material is preferred to be used. Also, the gripping surface area of the sleeve is limited by usable space in the enclosure.

Titanium is the preferred material since it has the highest coefficient of friction to PTFE and remains ductile in the limited space provided by the enclosure. It is also important to use a high coefficient of friction material such as titanium because such methods of squeezing a material to a greater degree such as a highly ductile material such as copper only extrudes material outside the usable space of the device.

Another aspect of the disclosure is squeezing a more ductile material to impart more normal force in the crimp will not damage the plastic braid or the wire and not compromise the strength of the crimp assembly.

Another aspect of the disclosure is to control the compression to impart the necessary force to hold the wire and the braid in the crimp, keep the crimp within the space allowed by the device, and yet not brutalize the braid or the wire with the crimp. This is accomplished by tightly controlling compression with die press tooling and tight tolerancing on the sleeve.

Still another aspect of the disclosure is a high volume sleeve that splices a small diameter Teflon coated wire to an exotic fiber braided cord.

Still another aspect of the disclosure is the ratio is defined by a mathematical formula that includes cross sectional area of the sleeve, cross sectional area of the wires and fibers to be crimped, and the cross sectional area of the sleeve after it is crimped. The resulting ratio provides for the functionality of an effective sleeve.

Other aspects of the disclosure will become apparent upon a reading and understanding the detailed description.

BRIEF DESCRIPTION OF THE DRAWINGS

FIG. 5 illustrates a table showing one example of data used to determine optimum range of crimping of the sleeve.

DETAILED DESCRIPTION OF THE DISCLOSURE

The disclosure relates to a crimp sleeve. More particularly, it relates to a crimp sleeve for use within small enclosures and which crimps together two very dissimilar materials.

Specifically, the crimping sleeve of the present disclosure is unique in that it joins a wire such as PTFE coated stainless steel wire that has a low coefficient of friction to a fiber such as Vectran braid. Vectran is a material which is a very fine weave of Liquid Crystal Polymer that is often used in high performance applications. The sleeve is able to maintain the tensile strength of the stainless steel wire. Crimping such radically dissimilar materials to the performance criteria is a unique aspect of the disclosure.

The performance criteria for the materials are further complicated by the relatively small size of the enclosure which houses the crimp.

Figure 1:
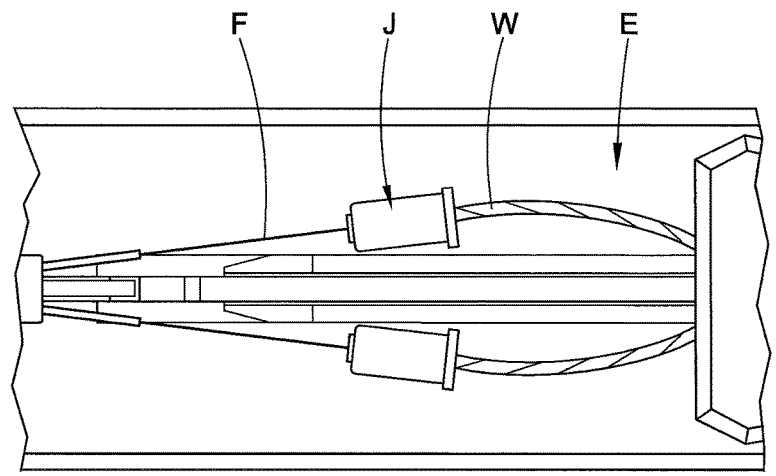
FIG. 1 illustrates an existing enclosure housing a joint between a wire and fiber.
Figure 2A:
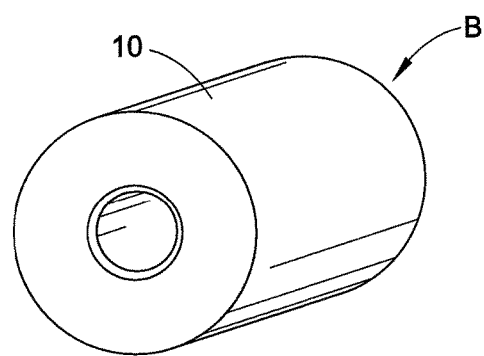
FIG. 2A is a perspective view of a crimp sleeve before being crimped in accordance with a preferred embodiment of the disclosure.
Figure 2B:
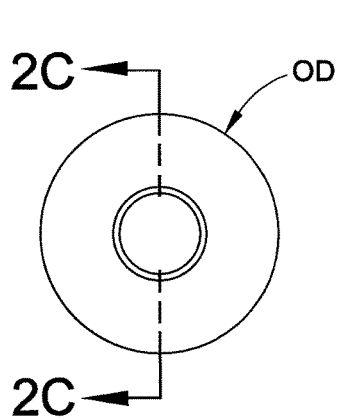
FIG. 2B is a front elevational view of the crimp sleeve of FIG. 2A.
Figure 2C:
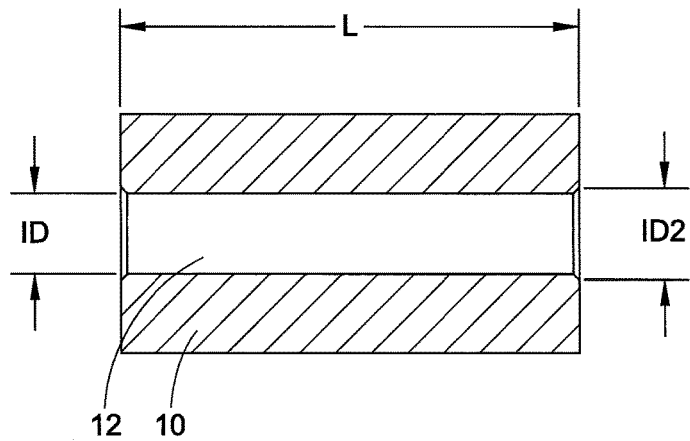
FIG. 2C is a cross-sectional view taken along lines 2C of FIG. 2B.

Referring now to FIGS. 2A-2C, a sleeve B in accordance with a preferred embodiment of the disclosure is shown. Specifically, sleeve B is shown in the pre-crimped or "before crimped" state and has a cylindrically shaped body 10 with an overall length L of about 0.220 inches, an outer diameter OD of about 0.114 inches and an inner opening 12 extending through the body having an inner diameter ID of about 0.039 inches. An outer edge or tapered lip has a diameter ID2 of about 0.044 inches. These dimensions of the sleeve are prior to crimping and are preferred but may vary slightly without departing from the present disclosure.

Figure 4A:
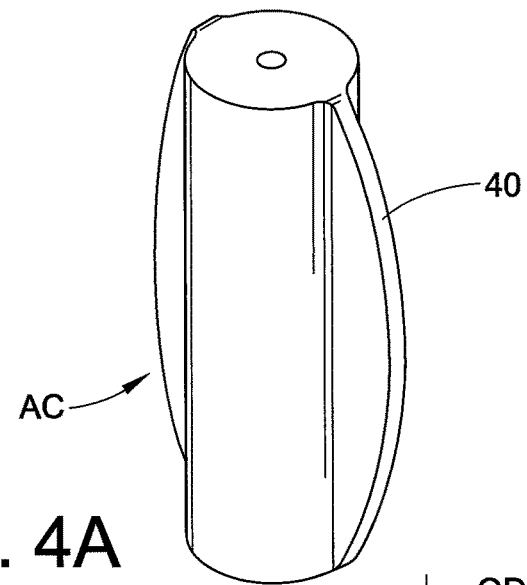
FIG. 4A is a perspective view of a crimp sleeve after being crimped in accordance with another aspect of the disclosure.
Figure 4D:
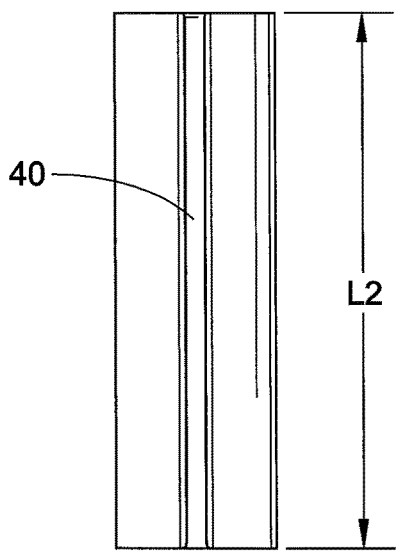
FIG. 4D is a side elevational view of the sleeve of FIG. 4A.
Figure 4B:
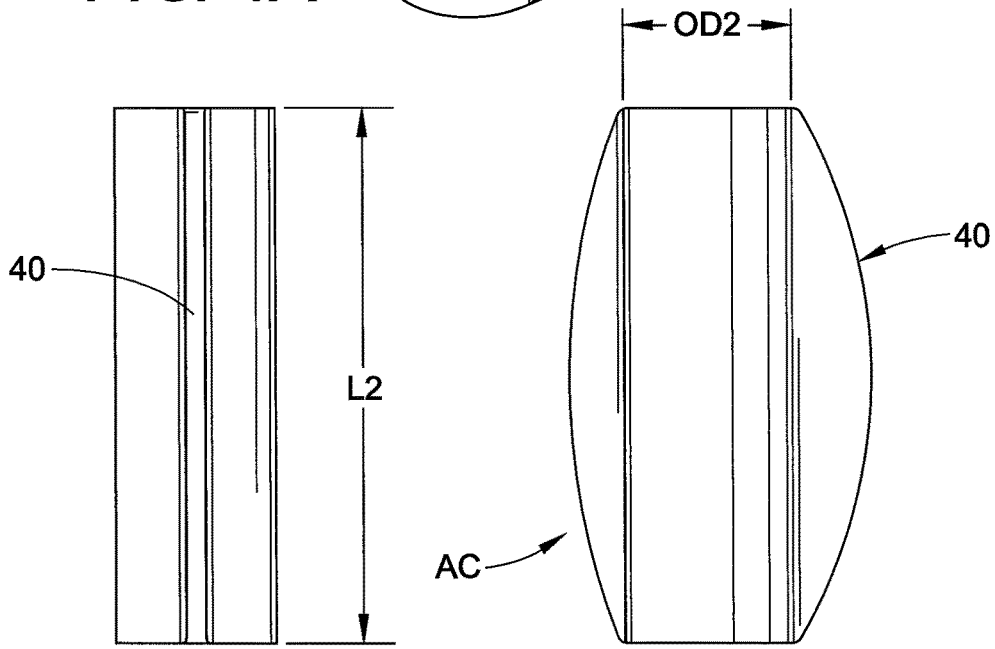
FIG. 4B is a front elevational view of the crimped sleeve of FIG. 4A.
Figure 4C:
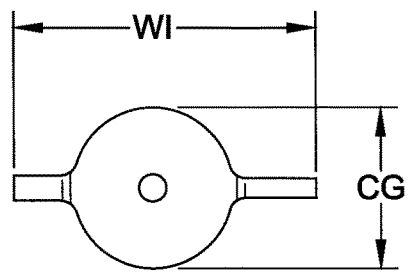
FIG. 4C is a top plan view of the sleeve of FIG. 4A.

The critical dimensions for the sleeves related to the "after crimping" configuration shown in FIGS. 4A-4D. Preferably, referring to FIGS. 4A-4D, the "after crimp" dimensions of the sleeve are a length L2 of about 0.300 inches long and an outer diameter OD2 of about 0.087 inches in diameter. Again, these dimensions are preferred but may vary slightly without departing from the scope of the disclosures. FIG. 4C also shows the outer diameter CG (the measured diameter of the crimp gage) and the width WI across the flash wings or protrusions or extensions 40.

The ratio of overall length L2 of the crimped sleeve relative to the outer diameter OD2 of the crimp is preferably 3.33 to 1; that is, L2/OD2=3.33/1.

FIGS. 4A-4D also illustrate flash wings or extensions 40 formed in the after crimped sleeve which extend from opposite side of the crimped sleeve. The crimp sleeve is also unique in that it uses either annealed grade 2 Titanium (of a hardness of 122 to 174 vickers, annealed), or grade 1 Titanium. Titanium is the preferred material for two reasons. First, it has the highest coefficient of friction relative to PTFE compared to commonly used crimp materials such as copper and aluminum. Second, titanium remains ductile during crimping, and ductility of the material is critical to an effective crimp sleeve.

The crimp sleeve has specific parameters that are highly dependent on maintaining strict process requirements relative to the amount of squeeze or force applied to the crimp. Specifically, the squeeze force is a ratio that is defined by a mathematical formula that includes: 1) cross sectional area of the sleeve, 2) cross sectional area of the wires and fibers to be crimped, and 3) the cross sectional area of the sleeve, after it is crimped. This formula has been commonly used in the industry and the resulting ratio provides for the functionality of an effective crimp sleeve. The formula is given below for what is termed "percent reduction". Percent reduction refers to the reduction in area of the sleeve before and after crimping, and the area of wire and fiber, and the ratio between their areas after squeeze or crimp of the sleeve. Specifically, SA=sleeve cross sectional area before crimping;

WA=wire cross sectional area;

FA=Fiber cross sectional area; and

DA=sleeve cross sectional area after pressing or crimping or die cross sectional area (omitting a flash pocket);

whereby Percent Reduction $PR=((SA+WA+FA)/DA)*100$

In theory, the Die Area DA would be 2 times the Die Height (i.e., 2×DH). In the case of the present disclosure, if the percent reduction PR is too high, then the crimp sleeve will brutalize or damage the Vectran braid or the wire and hence weaken the splice. If the percent reduction PR is too low, then there will not be sufficient force in the crimp to grip the PTFE coated wire to the required pull specification for the wire. The above formula, however, does not take into account the crimp material that flows into the flash pocket which forms the flash wings. Therefore, the formula assumes no flash pocket or flash pocket blend radius. However, providing for a flash pocket in crimps and crimp tooling is necessary to insure crimps do not stick or adhere to die tooling.

Figure 3:
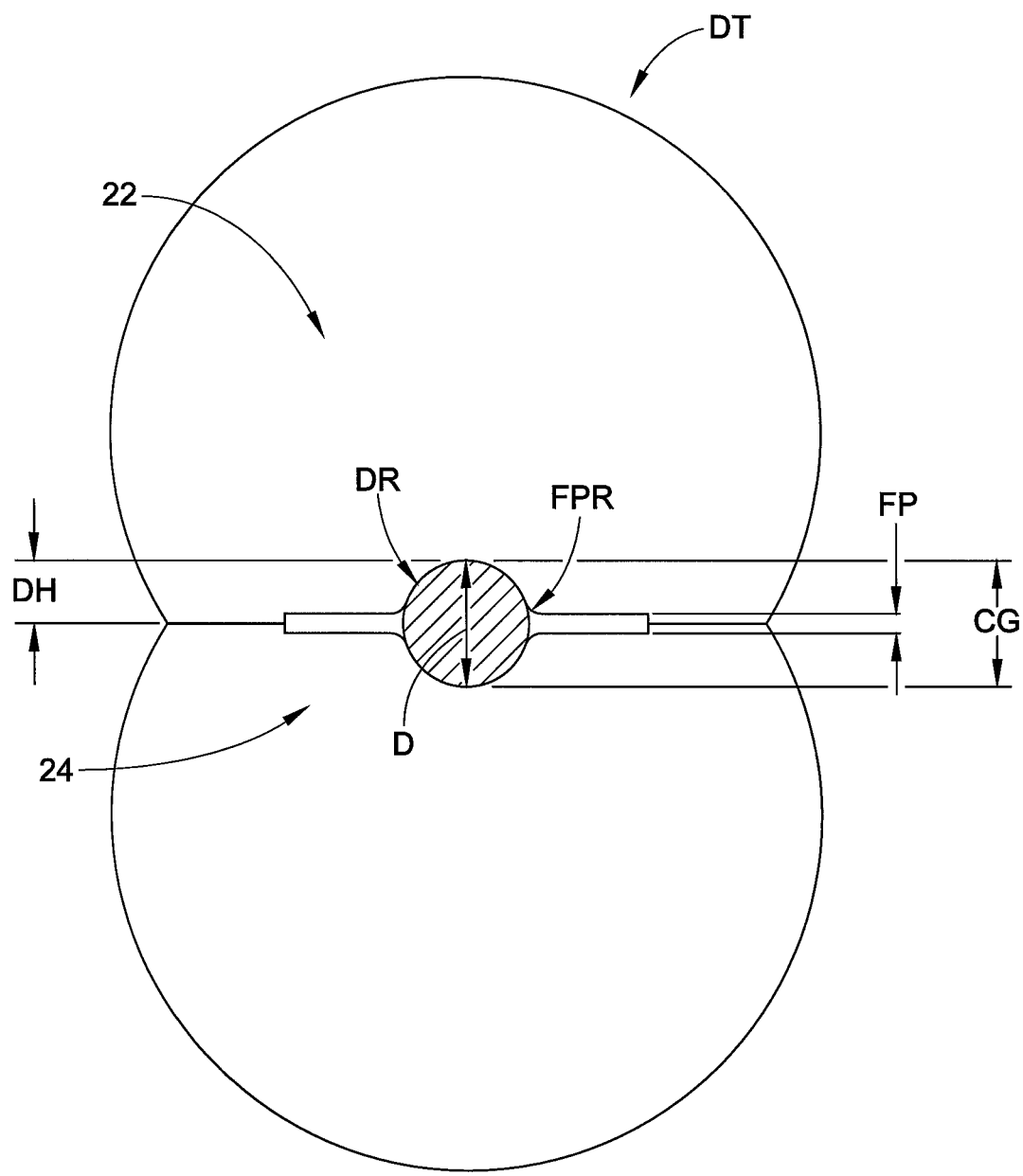
FIG. 3 is a side elevational view of a die in a closed configuration.

Referring now to FIG. 3, a die tooling assembly DT creates a flash relief pocket FP machined into each die half or section 22, 24. The die halves or sections 22, 24 can be of various shapes and configurations without departing from the scope of the disclosure. In the case of the present disclosure, the overall height dimension of the flash pocket is equal to two times the diameter of the wire+/−10% to insure that there is sufficient crimp sleeve material around the wire that is compressed and holds with sufficient force. The flash pocket FP cannot be too small as it would not allow proper flow of excess material being moved during the crimping process. Impeding this flow will cause forces in the crimp die tooling to be excessively high. A blend radius FPR is also provided in the transition of the radius DR of the crimp gage CG (measured dimension after crimp) to the flash pocket to allow flow but it also cannot be too large as it may decrease compression in the flash area of the crimp gage CG. The present disclosure preferably uses a blend radius FPR of about 0.010 inches+/−0.001.

The value of the percent reduction PR ranges between 140% and 149%. In theory, Die area D would be 2 times Die Height DH (2×DH) if the flash pocket is neglected. However, accounting for all the variables herein, the flash pocket and the depiction of the die area D are used in the percent reduction equation where D=die area, DR=die radius, DH=die height; wherein:

$$D = 2\left[(DR)^2 \text{COS}^{-1}\left(\frac{DR-DH}{DR}\right) - (DR-DH)\sqrt{(2DR*DH)-(DH^2)}\right]$$

Referring now to FIG. 4, the sleeve AC after crimping is shown. The crimp sleeve has a flash wing or portion 40 formed on opposite sides of the sleeve AC which extends along a longitudinal axis of the sleeve AC.

Referring now to FIG. 5, one example of data used to obtain an optimum range of crimping the sleeve is shown. The results are based on a crimped sleeve outer diameter (OD2) of 0.114 inches, an inner diameter (ID2) of 0.039 inches, a length (L2) of 0.220 inches, a width over wings (WI) (FIG. 4C) of 0.165 inches, a wire type of 0.008 304 stainless steel, a titanium sleeve, an axis orientation of wire and fiber in relation to each other, and an area of fiber and wires of 0.009012 inches (together). The chart illustrates that the die area has a percent reduction (PR) range of between 1451082% to 149.8987%. The chart of FIG. 5 is only one example of various loads applied, however, many other variations can be used. The actual percent reduction range is between 140.0511% to 149.0000%. Various results can occur during the crimping process. Optimally, wire break is the preferred result, but other modes of failure can occur such as wire slipping out of the crimp sleeve, the Vectran breaking at crimp or the Vectran slipping out of the crimp sleeve.

There is also a version of this sleeve that is made from annealed 6061 T6 aluminum that is hard anodized. The hard oxide breaks up during the crimp and digs into the wire. This action grips the wire similar to grit coatings.

The exemplary embodiment has been described with reference to the preferred embodiments. Obviously, modifications and alterations will occur to others upon reading and understanding the preceding detailed description. It is intended that the exemplary embodiment and appended claims be construed as including all such modifications and alterations insofar as they come within the scope of the above description or the equivalents thereof.

The invention claimed is:

1. A crimp sleeve, comprising:
a body having an outer diameter and an opening having an inner diameter extending through said body;
said sleeve joins a wire to a fiber through said opening, wherein said sleeve is formed of a material which has a high coefficient of friction relative to said wire.

2. The crimp sleeve of claim 1, wherein said sleeve material is titanium.

3. The crimp sleeve of claim 1, wherein said wire is formed of PTFE coated stainless steel wire.

4. The crimp sleeve of claim 1, wherein said fiber is formed of Vectran braid.

5. The crimp sleeve of claim 2, wherein said titanium is grade 2 titanium.

6. The crimp sleeve of claim 2, wherein said titanium is grade 1 titanium.

7. The crimp sleeve of claim 1, wherein a flash extension is formed on opposite sides of said sleeve after crimping.

8. The crimp sleeve of claim 7, wherein said flash extension is formed by a die when sleeve material flows into a flash pocket of said die during crimping.

9. A crimp sleeve for use with an associated enclosure, comprising:
a cylindrical body having an opening extending therethrough;
said body formed of titanium;
wherein said opening accommodates wire and fiber to be joined together, wherein said body is crimped by an associated die to form flash material on opposite sides of said body.

10. The crimp sleeve of claim 9, wherein said cylindrical body has a length before crimping of about 0.220 inches.

11. The crimp sleeve of claim 9, wherein said cylindrical body has a length of about 0.300 inches after crimping.

12. The crimp sleeve of claim 9, wherein said wire is PTFE coated stainless steel wire.

13. The crimp sleeve of claim 9, wherein said fiber is Vectran braid.

14. The crimp sleeve of claim 9, wherein a flash wing is formed on opposite sides of said cylindrical body after crimping.

15. The crimp sleeve of claim 9, wherein said body has an outer diameter of about 0.114 inches before crimping.

16. The crimp sleeve of claim 15, wherein said body has an outer diameter of about 0.087 inches after crimping.

17. The crimp sleeve of claim 16, wherein a ratio of said length after crimping to said outer diameter after crimping is about 3.33 to 1.

* * * * *